United States Patent [19]

Levecque, deceased et al.

[11] 4,249,926
[45] Feb. 10, 1981

[54] METHOD FOR JET ATTENUATION OF FIBERS WITH LOCALIZED COMBUSTION

[75] Inventors: Marcel Levecque, deceased, late of Birchrunville, Pa.; by Marc Levecque, administrator, Paris, France; Jean A. Battigelli; Dominique Plantard, both of Rantigny, France

[73] Assignee: Saint-Gobain Industries, Neuilly-sur-Seine, France

[21] Appl. No.: 66,938

[22] Filed: Aug. 16, 1979

Related U.S. Application Data

[60] Continuation-in-part of Ser. No. 873,734, Jan. 30, 1978, abandoned, which is a division of Ser. No. 829,515, Aug. 31, 1977, Pat. No. 4,113,456, and a continuation-in-part of Ser. No. 780,589, Jan. 24, 1977, Pat. No. 4,070,173, and Ser. No. 762,789, Jan. 25, 1977, Pat. No. 4,102,662, and Ser. No. 676,755, Apr. 14, 1976, Pat. No. 4,118,213, each is a continuation-in-part of Ser. No. 557,282, Mar. 11, 1975, Pat. No. 4,015,964, which is a continuation-in-part of Ser. No. 353,984, Apr. 24, 1973, Pat. No. 3,885,940.

[30] Foreign Application Priority Data

Aug. 16, 1979 [EP] European Pat. Off. ........... 78400093

[51] Int. Cl.³ .................. C03D 37/06; D01D 5/08
[52] U.S. Cl. ................................................ 65/5; 65/16; 264/5; 264/12; 425/7
[58] Field of Search ............... 65/5, 16; 264/5, 12, 264/176 F; 425/7

[56] References Cited

U.S. PATENT DOCUMENTS

| | | |
|---|---|---|
| 2,515,738 | 7/1950 | Slayter ................................ 65/16 |
| 2,814,832 | 12/1957 | Stephens ............................... 65/5 |
| 3,224,852 | 12/1965 | Stalego ............................... 65/5 X |
| 3,874,886 | 4/1975 | Levecque et al. ................. 65/16 X |

*Primary Examiner*—Robert L. Lindsay, Jr.
*Attorney, Agent, or Firm*—John T. Synnestvedt; Kenneth P. Synnestvedt

[57] ABSTRACT

Multiple jet fiber attenuation, the jets converging to provoke mutual impact and create a combined jet flow, the jets comprising fuel and comburent components in proportions providing a combustible mixture in the combined jet flow, a stream of attenuable material being delivered into the combined jet flow and providing for ignition of the combustible mixture in a localized zone and thus for attenuation at elevated temperature in said zone.

12 Claims, 7 Drawing Figures

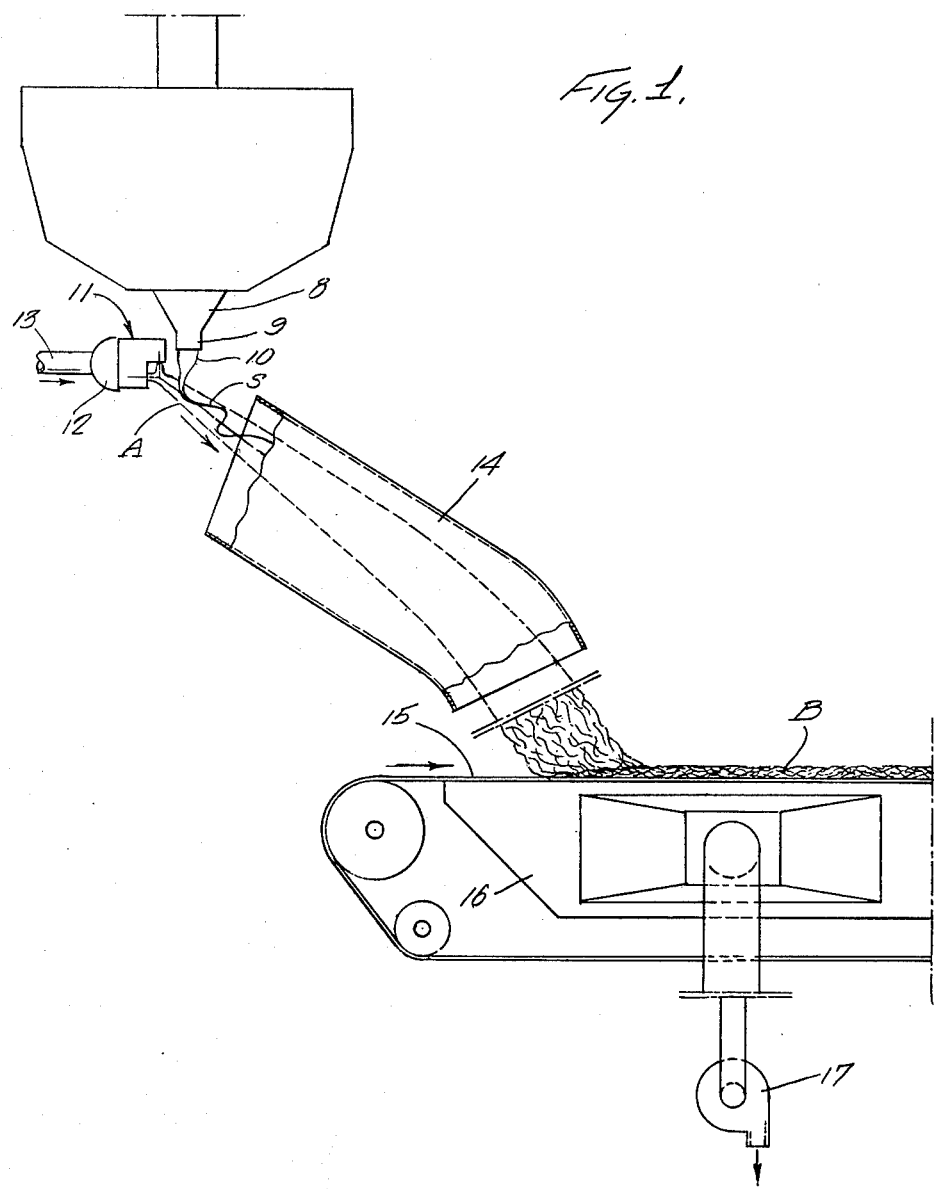

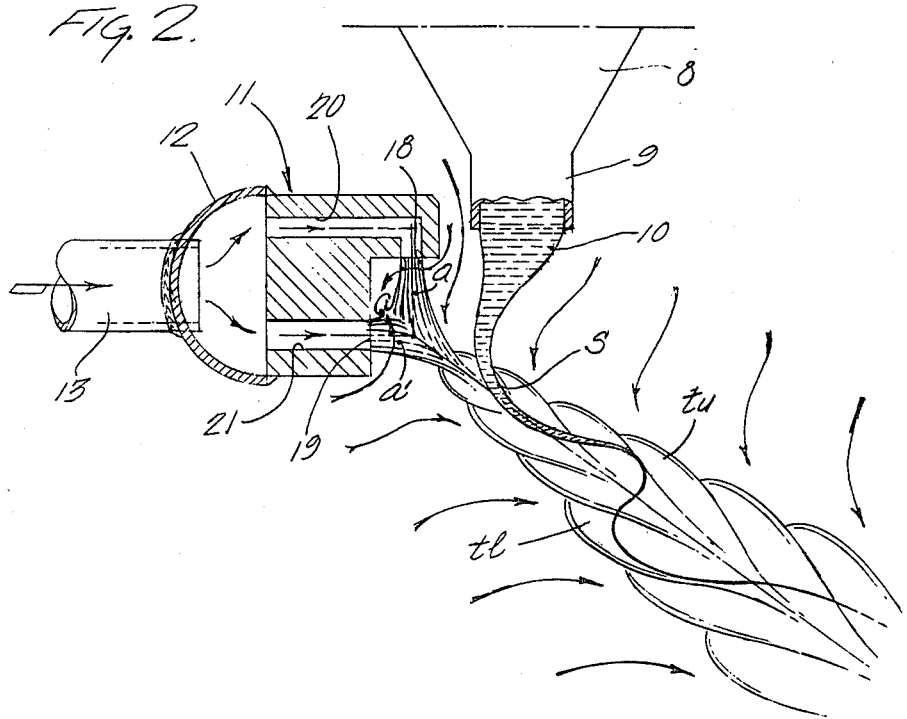
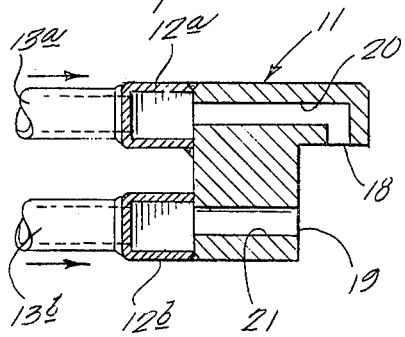 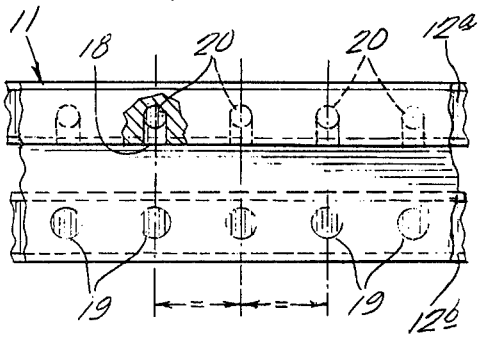

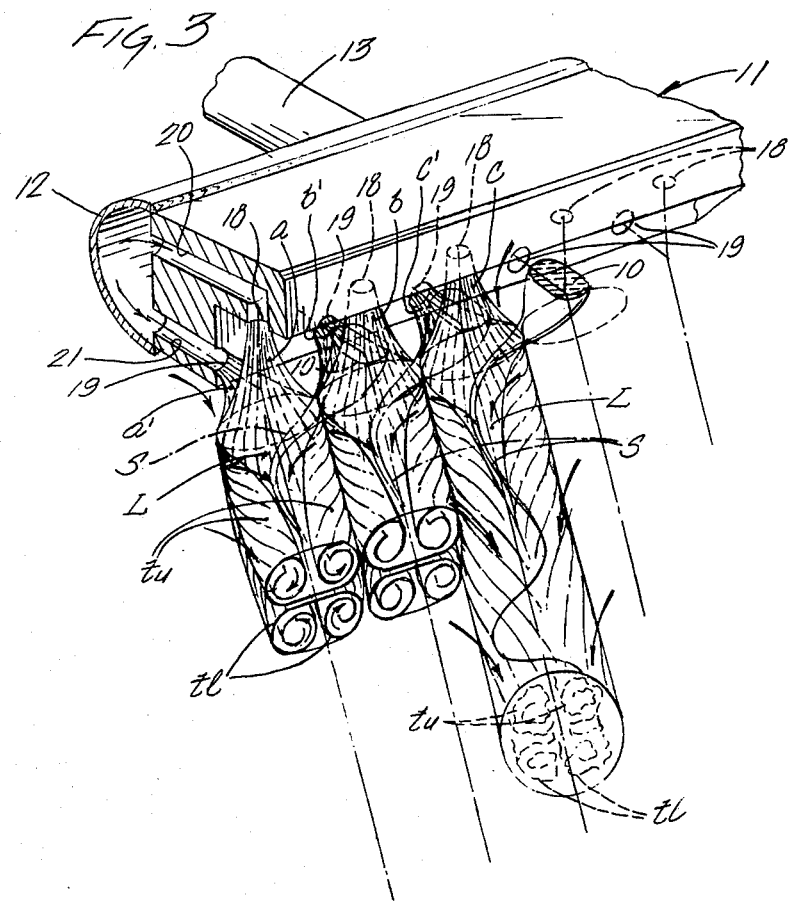
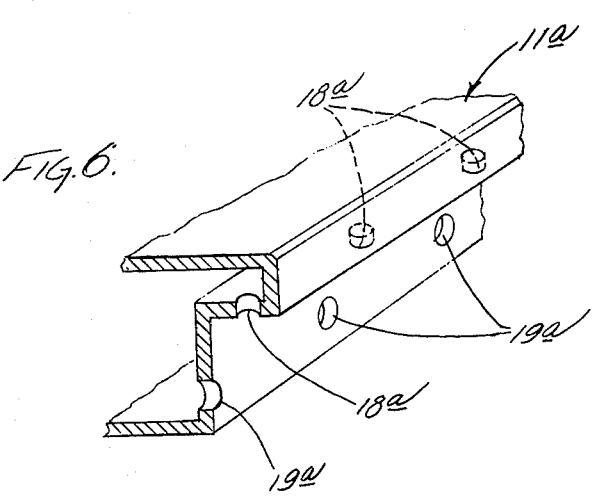

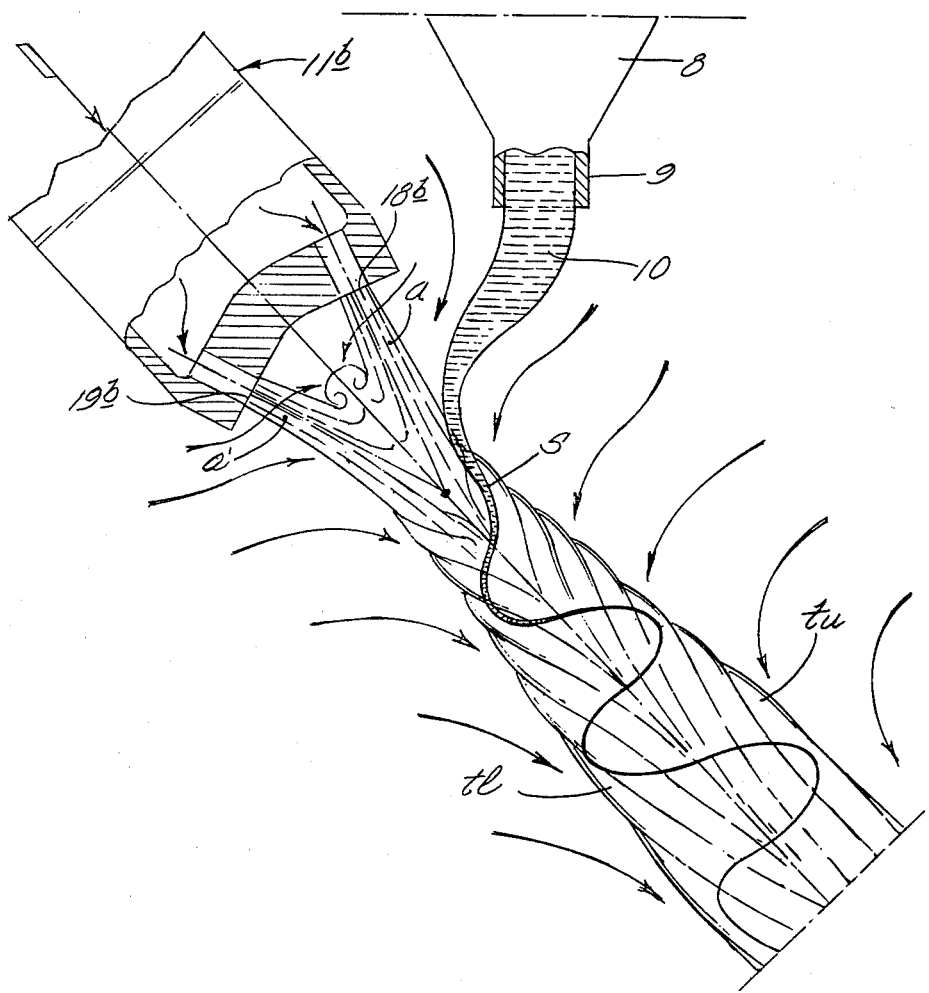

METHOD FOR JET ATTENUATION OF FIBERS WITH LOCALIZED COMBUSTION

CROSS REFERENCES

The present application is a continuation-in-part of our application Ser. No. 873,734, filed Jan. 30, 1978, now abandoned, which is a division of our application Ser. No. 829,515, filed Aug. 31, 1977 and issued as U.S. Pat. No. 4,113,456, and a Continuation-in-Part of our prior applications Ser. Nos. 780,589, filed Jan. 24, 1977, and issued as U.S. Pat. No. 4,070,173, 762,789, filed Jan. 25, 1977, and issued as U.S. Pat. No. 4,102,662, and 676,755, filed Apr. 14, 1976 and issued as U.S. Pat. No. 4,118,213, which in turn are Continuations-in-Part of our application Ser. No. 557,282, filed Mar. 11, 1975, and issued as U.S. Pat. No. 4,015,964, which, in its turn, is a Continuation-in-Part of our application Ser. No. 353,984, filed Apr. 24, 1973, and issued as U.S. Pat. No. 3,885,940.

BACKGROUND AND STATEMENT OF OBJECTS

This invention relates to the fiberization of attenuable materials and is adapted for use in the formation of fibers from various thermoplastic mineral materials, such as glass and similar compositions which are rendered molten by heating. Since the technique of the invention is especially useful in the attenuation of glass and similar thermoplastic materials, the following description refers to the use of glass by way of illustration.

In the attenuation of molten glass in order to effect fiberization by various techniques employing gaseous attenuating blasts or jets, it is ordinarily desirable to arrange the attenuation components and the means for introducing the molten glass in a manner avoiding substantial fragmentation of the glass, the avoidance of such fragmentation being desirable in order to provide for the production of fibers of good length. In addition, in techniques of this type, it is also desirable to provide for fiber production with a minimum expenditure of heat or energy. The technique of the present invention is adapted to achieve these general purposes; and at the same time, to accomplish certain other objectives, as will be explained more fully as this description proceeds.

In prior Application of the present Applicants, Ser. No. 834,541, filed Sept. 19, 1977, there is disclosed an attenuating jet arrangement employing a pair of gaseous jets of substantially equal kinetic energy per unit of volume and whose axes are disposed in substantially the same plane, the two jets inducing ambient gas and converging in a zone so as to provoke mutual impact and lateral spreading of the combined jet flow, the technique of said prior application further providing for the employment of a multiplicity of pairs of such jets arranged in side-by-side relation and sufficiently close to each other so that the lateral spreading of the combined flow of the pairs of jets causes impingement of the combined flow of the pairs upon each other. In this configuration of gaseous jets, the impingement of the pairs of spreading jets upon each other results in the development of pairs of counter-rotating tornadoes, with an intervening zone of laminar flow therebetween. The tornadoes merge downstream of the zone of laminar flow and a stream of molten glass is delivered into each zone of laminar flow from a point offset toward one side of both jets of the pair. This stream is carried by the laminar flow into the influence of the merging flow of the tornadoes. This system provides for introduction of the streams of attenuable material without fragmentation and results in attenuation of relatively long fibers.

In said prior application, the jet system just described is also disclosed in association with a larger gaseous blast, and the combined jet flow of each pair of jets is directed transversely toward the blast and has a higher kinetic energy per unit of volume than the blast, so that each combined jet flow penetrates the blast, thereby developing a zone of interaction in the blast by means of which the fiber being formed is subjected to a second stage of attenuation.

In our prior Applications Ser. No. 873,734, filed Jan. 30, 1978 and No. 829,515, filed Aug. 31, 1977, a jet and blast system of the kind just referred to is also disclosed together with provision for introducing fuel and comburent components into the zones of interaction of the jets in the blast in a manner providing for development of a combustible mixture in said zones of interaction and further providing for ignition of the combustible mixture in said zones of interaction. This provides for localized combustion and elevation of temperature in the attenuation zones within the blast.

In the technique provided according to the present invention, provision is made for the development of a plurality of pairs of side-by-side gaseous jets with the axes of the jets of each pair disposed in substantially the same plane and with the jets converging to a zone of impact and lateral spreading, so that the combined flow of the pairs of jets impinge upon each other and develop the pairs of tornadoes as above described, with an intervening zone of laminar flow; and in addition, in accordance with the technique of the present application, the jets comprise fuel and comburent components in proportions providing a combustible mixture in the combined flow of each pair of jets. Moreover, in accordance with the technique of the present application, conditions are maintained in order to provide for ignition of the combustible mixture in the combined jet flow of each pair of jets, so that a localized elevated attenuating temperature is provided in the jet flow itself, thereby providing for effective attenuation of long fibers without employment of a blast into which the jets are delivered, as in the prior technique referred to above.

The "energy localization" provided by the present invention in the manner just referred to thus provides for energy conservation within the jet system itself, thereby simplifying the equipment since it is not necessary to provide a means for generating a larger blast, as in the prior technique above described.

The technique of the present invention also is particularly advantageous for the attenuation of very hard glass which requires relatively high temperature in order to obtain appropriate viscosity for fiberization. Such relatively high fiberization temperature can readily be attained within the jet flow itself, in view of which the glass supply equipment, such as a bushing, may be maintained at lower temperature than would be required with other fiberization techniques. This, in turn, is of advantage because with hard glasses requiring high temperatures for effective fiberization, such high temperatures detrimentally affect the glass supply bushing or equivalent glass supply means.

BRIEF DESCRIPTION OF THE DRAWINGS

Several forms of equipment suitable for carrying out the technique of the present application are disclosed in the accompanying drawings, in which:

FIG. 1 is a somewhat schematic outline view of one form of equipment employing a twin jet system for fiberization and for energy localization in the attenuation zone, this view also somewhat diagrammatically indicating a fiber-collecting system;

FIG. 2 is a fragmentary enlarged view of one pair of jets of a system of the kind shown in FIG. 1, with certain parts shown in section.

FIG. 3 is a perspective somewhat diagrammatical illustration of the equipment shown in FIGS. 1 and 2 and illustrating the combined jet flow of several pairs of jets;

FIG. 4 is a fragmentary face view of a portion of the jet delivery device of FIGS. 1 to 3 inclusive;

FIG. 5 is a fragmentary sectional view similar to a portion of FIG. 2 but illustrating a modified form of the jet delivery device;

FIG. 6 is a fragmentary perspective view of another modified form of jet delivery device; and FIG. 7 is a view similar to FIG. 2 but illustrating another modified twin jet arrangement useable according to the present invention.

DETAILED DESCRIPTION

In the following description, reference is first made to the embodiment or structural arrangement shown in FIGS. 1 to 4 inclusive of the drawings.

In the overall general view of FIG. 1, a molten glass supply bushing is indicated at 8, the bushing preferably having a series of delivery devices 9, each with an orifice for discharging molten glass in the form of tips or bulbs such as indicated at 10, which are delivered downwardly into the influence of the gaseous jets in a manner described more fully hereinafter.

The jet delivery device 11 has passages and orifices for discharge of the gaseous jets, as will be explained hereinafter, and these jets are supplied from a manifold 12 with which the supply line 13 is associated.

The glass streams are developed from the tips or bulbs 10 in the influence of air currents induced by the jets and by the combined jet flow and these glass streams enter the combined jet flow and undergo attenuation in the manner described hereinafter. The attenuated fibers are guided by the duct 14 downwardly toward the perforated conveyor 15 serving as a fiber-collecting device, suction means such as the suction box 16 and the suction fan 17 being associated with the conveyor in a manner generally well known in this art.

As best seen in FIGS. 2 and 3, the jet device 11 is provided with pairs of jet orifices 18 and 19, a series of such pairs of orifices being indicated in FIG. 3. Each orifice 18 is associated with a flow passage 20 in the jet device 11, which passage communicates with the manifold 12 and which has an angled end adjacent to the delivery orifice for directing the jet a downwardly. The orifice 19 is associated with a passage 21 also communicating with the manifold 12 and arranged to deliver the jet a' horizontally. In FIG. 3, the jets delivered from each of the pairs of orifices are indicated at a—a', b—b' and c—c'; and in this connection, it is noted that while three pairs of jets appear in the perspective view of FIG. 3, only a single pair of jets (a—a') appears in FIGS. 1 and 2.

As generally represented in FIGS. 1 and 2, the pair of jets at each fiberizing center, for instance jets a—a', are directed at right angles toward each other and impinge upon each other in their common plane and produce a combined jet flow indicated at A in FIG. 1, in which a stream of attenuable material is subjected to attenuation. The fibers formed from a series of fiberizing centers are deposited upon a foraminous conveyor or belt, above described, in the form of a fiber blanket B, as appears in FIG. 1.

The attenuating action effected by the equipment, as described above, can best be explained and analyzed by reference to FIGS. 2 and 3.

The action at each fiberizing center is influenced by and related to the action of the jets or of the jet flow in adjoining fiberizing centers. In FIG. 3, the illustration represents the action at the fiberizing centers corresponding to jets a—a', b—b' and c—c'; whereas FIG. 2 illustrates the action at the fiberizing center a—a' only.

In analyzing the operation, it is first pointed out that any gaseous jet delivered from an orifice induces ambient gas or air and the cross-sectional area of the jet thus expands as it leaves the delivery orifice. Arrows applied to FIGS. 2 and 3 indicate induced air currents, and the expansion of the jets also appears in FIGS. 2 and 3.

In the arrangement shown in these figures, the two jets of each pair are also directed so as to impinge upon each other in the common plane of the jets, and this results in lateral spreading or broadening of the combined jet flow, as is also clearly apparent in FIG. 3. Still further, as the combined jet flow of each pair of jets spreads laterally, the adjoining combined flow of pairs of jets impinge upon each other.

This impingement of the adjoining combined flows of pairs of jets develops two pairs of miniature tornadoes in each jet flow, with the points of origin or apices of the tornadoes of each pair located at the points of impingement of the adjoining jets. In each pair of tornadoes, the two tornadoes are positioned in spaced relation toward opposite sides of the common plane of the axes of the pair of jets. When viewed as in FIGS. 2 and 3, the upper pair of these miniature tornadoes, indicated at tu—tu, have whirling currents circulating or turning in directions toward each other at the upper side of the tornadoes and away from each other at the lower side, as is indicated by the arrows in FIG. 3. On the other hand, the lower pair of tornadoes, indicated by letters tl, turn in the opposite directions, as is also indicated by arrows.

Between the two pairs of tornadoes in each combined jet flow, in the region of impingement of adjoining jets upon each other, a zone L of laminar flow associated with the tornadoes is developed. This zone has high intensity inflow of induced air, and it is into this laminar flow zone, between the two tornadoes of the upper pair, that the stream of glass is introduced. As clearly appears in FIGS. 2 and 3, the stream S of the glass is developed from the glass bulb, which buld or cone is located in a position horizontally offset from the jet delivery device. However, because the glass of the bulb 10 is in flowable condition as released from the delivery device, the stream S of the attenuable glass is deflected from the horizontally offset position of the bulb toward the laminar flow zone L, this deflection occurring as a result of the intense inflow of induced air, and this effect assures entrance of the stream of attenuable material into the laminar zone. Indeed, even with some misalignment of the glass delivery device 9 with respect to the pairs of jets, the inflow of induced air will automatically compensate for such misalignment and bring the glass stream into proper position.

From the above, it will be seen that by developing the pairs of tornadoes with the intervening zone of laminar flow at each fiberizing center, and by delivering the attenuable material in attenuable condition into the region near said zone, the induced air automatically carries the stream of attenuable material into the zone of laminar flow and automatically compensates for misalignment, thereby providing a highly stable introduction of the attenuable material into the system.

The arrangement as described above and the action of the induced air currents provides for stable introduction of the attenuable material into the system, even where the glass delivery devices are appreciably spaced away from the jet delivery devices, which is desirable in order to facilitate maintenance of appropriate temperature control for both the glass delivery devices and the jet delivery devices.

As seen in FIG. 3, the pairs of tornadoes tu and tl tend to merge downstream of the laminar zone L, and as the flow progresses downstream, the tornadoes tend to lose their identity, as is indicated (toward the right of FIG. 3) by the sectional showing of the two pairs of tornadoes originating with the jets c—c'.

As shown in FIGS. 2 and 3, each stream S of glass is subjected to attenuation in the jet flow downstream of the zone of laminar flow.

The action of the jets at each fiberizing center, particularly in the development of the pairs of tornadoes with the intervening zone of laminar flow, is achieved by employment of pairs of jets which are preferably of substantially the same kinetic energy per unit of volume; preferably also, the jets of each pair do not widely differ in cross-sectional area. Advantageously, the cross-sectional area of the two jets is the same or approximately the same, and if some difference is present, the cross-sectional area of one jet should not be more than about two times the cross-sectional area of the other jet, where the kinetic energy per unit of volume of the two jets is the same or substantially the same, as is preferred.

The jets need not necessarily have exactly the same cross-sectional dimensions in directions transverse to and parallel to the common plane of the axes of the two jets.

When the two jets of a pair are fed separately, one of them is desirably fed with air and the other one with a mixture of air and fuel (for instance 10 to 1), in order to obtain the stoichiometric mixture in the mixing zone and combustion zone.

It is also to be noted that for the purpose of establishing the zone of laminar flow, into which the stream of glass may be introduced without fragmentation, it is important that the jets be generated in positions so that their axes are directed substantially in a common plane and impinge upon each other in said plane, desirably at an angle within a range of about 10° to 90° from each other, although an angle somewhat greater than 90° may even be employed. Angles substantially less than 90°, for instance from about 30° to about 60°, are especially desirable because such angles tend to set up the localized combustion in the jet flow farther downstream of the jet orifices and this makes possible greater separation between the glass supply means and the jet devices.

In an embodiment such as shown in FIGS. 1 to 4, the desired localized zone of combustion is established by premixing fuel and comburent components and delivering the mixture to both jets through the common manifold 12. The specific manner of accomplishing this will be referred to more fully hereinafter, following description of the structure of other embodiments.

Turning now to the embodiment illustrated in FIG. 5, it is first noted that the jet delivery device 11 is of the same shape and construction as the device 11 described above with reference to FIGS. 1 to 4. However, in FIG. 5, instead of employing a single manifold feeding both the upper jet passages 20 and the lower jet passages 21, separate manifolds 12a and 12b are provided for the upper and lower jet passages, the manifolds 12a and 12b being supplied from separate supply lines 13a and 13b. By provision of these separate manifolds and separate supply lines, it is possible to deliver jet fluids of different composition, pressure, velocity or temperature to the upper and lower jet orifices.

As already noted, in the arrangement of FIGS. 1 to 4, the premixed fuel and comburent are supplied to both the upper and lower jets, but the arrangement of FIG. 5 makes possible the delivery of the fuel through only one of the jets of each pair and would also make possible certain other variations in the feed, for instance, the supply of mixed fuel and comburent to the upper and lower jets of different composition or concentration. Still further, the arrangement of FIG. 5 would make possible some variation in the kinetic energy per unit of volume of the individual jets of each pair.

Turning now to the embodiment illustrated in FIG. 6, it will be noted that here the jet delivery device 11a comprises a hollow manifold of complex sectional configuration providing for arrangement of upper and lower jet orifices 18a and 19a respectively directed downwardly and horizontally in the same general relationship as in the embodiment of FIGS. 1 to 4 and in the embodiment of FIG. 5; but since the delivery device 11a itself comprises a common manifold for feeding all of the jet orifices, the jet fluid would necessarily comprise premixed fuel and comburent components, as is also the case with the embodiment of FIGS. 1 to 4.

FIG. 7 illustrates still another embodiment of equipment useable according to the present invention. In this embodiment, the jet delivery device 11b is provided with pairs of jet orifices 18b and 19b which are both fed from a common chamber or manifold within the device 11b and which, therefore, would comprise the same composition. However, in FIG. 7, it will be noted that, instead of employing jets which are directed toward each other substantially at right angles, the jets are directed toward each other at a much smaller angle, for instance, an angle on the order of about 30°. Here again, it is contemplated that the jets of each pair have their axes lying in the same plane and further that a plurality of pairs be employed in side-by-side relation and positioned sufficiently close to each other so that the spreading combined jet flow of each pair will impinge upon the spreading combined jet flow of adjoining pairs, thereby developing the upper and lower pairs of tornadoes tu and tl. This configuration is also characterized by the presence of the laminar zone between the pairs of tornadoes at opposite sides of both jets; and in FIG. 7, the glass stream S is shown as entering the laminar flow zone between the pair of tornadoes tu, as in FIG. 2.

With regard to the feed of the fuel and comburent components, it is pointed out that in general, it is preferred that in the attenuation zone of the combined jet flow at each fiberizing center, for instance, just downstream of the point of introduction of the glass stream into the zone of laminar flow, the concentration of the fuel and comburent should preferably comprise a stoichiometric mixture, so that the mixture will readily ignite and burn in a localized area concentrated in the region where most of the attenuation is actually occurring. This will provide maximum utilization of the energy of the fuel. In addition, with relatively hard glasses, this condition will provide the desired high temperature in the zone where the attenuation is occurring even though the supply of the glass delivered from the bushing is not at a temperature sufficiently high to provide the optimum viscosity for fiberization. Thus, the stream of glass which is delivered in flowable condition into the zone of laminar flow will reach, in the attenuation zone of the combined jet flow, the optimal conditions for fiberization because of the localized combustion in said attenuation zone.

In a typical embodiment of the equipment according to FIGS. 1 to 4, the orifice 18 and the passage 20 was of 1 mm diameter and the orifice 19 and the passage 21 of 1.5 mm diameter. The two jets were directed toward each other at 90°. The diameter of the glass delivery orifice was of 1.8 mm. With this equipment, a mixture of 80% of $H_2$ in air was delivered through both jets at a pressure of 2.5 bar, the hydrogen flow rate being of 7 $Nm^3$ per hour and per pair of jets. The jets had a temperature of about 100° C. A molten material having the following composition: $SiO_2$: 45.85%, $TiO_2$: 2,75%, $Fe_2O_3$: 12.55%, $Al_2O_3$: 12.93%, CaO: 10.50%, MgO: 9.30%, $Na_2O$: 3.10%, $K_2O$: 1.20%, $P_2O_5$: 0.40%, miscellaneous: 1.42% by weight, was fed at a temperature of 1210° C. to the fiberizing centers. The rate of glass flow (or pull rate) was 24 kg/hole for each 24 hour period, and with these operating conditions the average fiber produced was 9 microns in diameter. In a second example with a hard glass at a viscosity of 190 poises, a mixture of 50% $H_2$ in air was used, with a hydrogen flow rate of 4 $Nm^3$ per hour and per pair of jets, the temperature of the jets being 100° C. In this case the fibers produced has a diameter averaging 25 microns.

The diameter of the fibers produced in these examples was about one third of the diameter resulting from the fiberization of the same materials under the same conditions except for the use of jets comprising air only, i.e., without the extra hydrogen.

In an embodiment such as shown in FIG. 5, the jet delivered from the orifice 19 may desirably comprise air, and the jet delivered from the orifice 18 should comprise a mixture of the comburent and fuel. These two jets may be reversed and the jet from orifice 18 comprise air and the jet from orifice 19 comprise the mixture.

In all cases, it will be noted that the stream of attenuable material in flowable condition is delivered into the combined jet flow in the zone of laminar flow between the pairs of tornadoes and from a point which is offset toward one side of both jets of a pair and of said combined jet flow. In this way, stable input or feed of the glass streams into the fiberizing centers is assured. The streams of glass introduced should also have a temperature sufficiently above the ignition temperature of the mixture of fuel and comburent components, in order to assure ignition and combustion in the desired localized zone in which the fiber attenuation is concentrated. In order to assure ignition in the attenuation zone, it is desirable to utilize jets having at lease some elevation in temperature, for instance in the neighborhood of 400° C., because in this way, the zone of ignition will be kept farther upstream than in the case where the jet temperature is very low. The jets should not be higher than the ignition temperature of the mixture, which in a typical case, would be of the order of 600° C. However, the jets may be introduced at lower temperatures, even down to ambient but for most purposes, the temperature of the jets is desirably at least 100° C. and preferably between 200° and 400° C.

Although hydrogen is a preferred fuel for many purposes, certain other fuels may be used, such as natural or propane gases. Important considerations in selecting the fuel are the characteristics with respect to ignition temperature and flame propagation rate. A fuel, and also the quantity or concentration thereof, with respect to the comburent, should be selected to promote ready ignition and a high propagation rate. In this way, the zone of localized combustion is established in a region of the combined jet flow having substantial attenuating energy, thereby avoiding the need for very high temperature in the glass supply. Hydrogen is particularly desirable from these standpoints; and in order to promote ready ignition, the mixture should include at least the stoichiometric quantity of the fuel.

It is also pointed out that the configuration of the jet delivery system is not only effective in providing attenuating forces which will act upon the glass streams introduced, but is also effective in assuring thorough intermixture of the fuel and comburent components, even where they are separately introduced, as is contemplated in the embodiment illustrated in FIG. 5.

In considering the ratio of fuel to comburent, it is first pointed out that under theoretically ideal conditions, stoichiometric proportions of fuel and comburent would be employed. However, a combustible mixture may be provided throughout a range varying from the stoichiometric ideal. Thus, in the case of the use of natural gas and air, the quantity of the air may range from about 0.8 to about 1.7 parts of the quantity of air providing stoichiometric proportions.

With such appropriate quantities of air and fuel, the zone of fiber attenuation comprises a combustible mixture, and this mixture in a typical technique according to the invention has an ignition point in a range below temperatures of typical molten glass compositions employed for fiberization, so that the delivery of the glass stream serves not only to introduce the attenuable material into the fiberizing zone but also serves to ignite the combustible mixture of the fuel and comburent brought into that zone by the jets. In consequence, the desired temperature, for example 1700° C., may readily be provided in the fiberization zone in order to provide for attenuation of the glass stream to form the fiber. The fiberizing zone may be at 1700° C., notwithstanding the fact that the temperature of the jets upstream of the combined jet flow and downstream of the zone of fiberization may be at a much lower temperature.

Various gaseous fuels may be employed such as natural, propane or other manufactured gases. Hydrogen is also an effective fuel to employ and is particularly desirable where it is of importance to control or shorten the length of the zone of combustion and thus maintain the zone well upstream in the combined jet flow.

We claim:

1. A method for manufacturing fibers from attenuable material, such as a thermoplastic material, by attenuation by means of gaseous currents, characterized in that at least one pair of gaseous jets is developed, said jets having substantially equal kinetic energy per unit of volume, and whose axes are disposed in substantially the same plane, the two jets inducing ambient gas and converging in a zone so as to provoke mutual impact and lateral broadening of the flow formed by the two combined jets, the jets comprising fuel and comburent components in proportions providing a combustible mixture in the combined jet flow, and characterized in that a stream of material is delivered into said zone, at a temperature at least as high as the ignition temperature of said mixture, from a point located outside of the angle included between the two jets, the mixture being ignited in the combined jet flow.

2. A method as defined in claim 1 in which the jets of the pair each comprise a mixture of fuel and comburent.

3. A method as defined in claim 1 in which one of the jets of the pair has a cross-sectional area not more than about two times the cross-sectional area of the other jet.

4. A method as defined in claim 3 in which the angle included between the axes of the jets of each pair is between 10° and 90°.

5. A method as defined in claim 1 in which the fuel component comprises hydrogen and in which the comburent component comprises air.

6. A method as defined in claim 5 in which the ratio of the hydrogen to air is from about four parts to about six parts of hydrogen for each part of air.

7. A method for forming a fiber from attenuable material, comprising directing a pair of gaseous jets along converging axes lying substantially in a common plane to provide for impingement of the jets on each other with consequent lateral spreading of the combined jet flow in a plane perpendicular to said common plane, obstructing the lateral spreading of the combined jet flow and thereby generating a pair of tornadoes in the edge portions of the combined flow of the jets with the tornadoes spaced from each other in said perpendicular plane toward opposite sides of said common plane and having a zone of laminar flow intervening therebetween and lying in said perpendicular plane, the jets comprising fuel and comburent components in proportion providing a combustible mixture in the combined jet flow, and delivering a stream of attenuable material in attenuable condition into said combined jet flow in the zone of laminar flow and from a point offset toward one side of both jets of the pair and of said combined jet flow, the stream of attenuable material being delivered into said zone at a temperature at least as high as the ignition temperature of said mixture.

8. A method as defined in claim 7 in which the obstructing of the lateral spreading of the combined jet flow is effected by directing a plurality of pairs of said gaseous jets in side-by-side relation and sufficiently close to each other to provide for impingement of the spreading combined flow of each pair of jets upon the spreading combined flow of adjoining pairs of jets.

9. A method as defined in claim 7 or claim 8 in which the jets of the pair have substantially the same kinetic energy per unit of volume.

10. A method as defined in claim 7 in which the jets of the pair each comprise a mixture of fuel and comburent.

11. A method as defined in claim 7 in which one of the jets of the pair comprises said fuel component, and the other of the jets of said pair comprises the comburent component.

12. A method as defined in claim 11 in which the jets of the pair have substantially the same kinetic energy per unit of volume.

* * * * *